United States Patent
McCord

(10) Patent No.: US 6,608,798 B2
(45) Date of Patent: Aug. 19, 2003

(54) TRANSMIT-RECEIVE SWITCH APPARATUS AND METHOD

(75) Inventor: Michael T. McCord, Waldorf, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/989,651

(22) Filed: Nov. 21, 2001

(65) Prior Publication Data

US 2003/0095474 A1 May 22, 2003

(51) Int. Cl.[7] .................................................. H04B 1/06
(52) U.S. Cl. ........................................ 367/135; 367/903
(58) Field of Search ................................. 367/135, 903, 367/901, 105, 122

(56) References Cited

U.S. PATENT DOCUMENTS

| | | |
|---|---|---|
| 4,158,781 A | 6/1979 | Skinner et al. |
| 4,222,113 A | 9/1980 | Hansen |
| 4,399,557 A | 8/1983 | Muszkiewicz |
| 5,199,299 A * | 4/1993 | Hughes et al. ............... 367/903 |
| 5,625,320 A * | 4/1997 | Hagerty ....................... 367/135 |
| 5,697,069 A | 12/1997 | Bohm et al. |
| 6,192,760 B1 | 2/2001 | MacLauchlan et al. |
| 6,198,288 B1 | 3/2001 | Gauss et al. |

* cited by examiner

Primary Examiner—Daniel T. Pihulic
(74) Attorney, Agent, or Firm—Stephen T. Hunnius; John J. Karasek

(57) ABSTRACT

A transmit-receive (T-R) switch for achieving fast T-R switching times while ensuring that the signal strength of a received signal is not fully coupled. A differential amplifier and an inverting amplifier, both having a coupling resistor as an input is used so that nearly all of the input signal is sensed by an operational amplifier. This technique improves transducer voltage transfer (coupling) ratio from 15–24% to about 100%. The T-R switch architecture is preferably to short-range, single-transducer acoustic ranging systems.

22 Claims, 3 Drawing Sheets

TRANSMIT-RECEIVE SWITCH APPARATUS AND METHOD

FIELD OF THE INVENTION

The present invention relates to acoustic ranging instruments including sonar systems, and more particularly to a system for improving coupled signals from a sonar transducer to a low-level pre-amplifier.

BACKGROUND OF THE INVENTION

Transmit-Receive (T-R) switches are typically found in acoustic ranging systems including sonar systems. For long range sonar systems, relays are employed to couple a transmitter and receiver to a transducer—a common element to both the transmitter and the receiver. For example, a relay energizes to connect the transmitter to the transducer. After a high energy pulse is applied to the transducer, the relay de-energizes. During the receive cycle, another set of relay contacts connect the receiver's input circuitry to the transducer. Typical relay switching times between transmit mode and the receive mode are on the order of 10–20 milliseconds, which corresponds to a minimum range of approximately 25–50 feet. The time interval between the end of a transmit pulse and the beginning of a receive signal is dead time having no usable information.

In order to eliminate the time-delay between relay switching times, short-range sonar systems use diode-resistor networks to provide near instantaneous switching between transmit and receive modes. The diode-resistor network has an advantage in that the receiver may remain coupled to the transducer. The receiver is protected from the high-voltage transmit pulse preferably by using steering diodes and resistors. Using the diode-resistor network, the time delay between a transmit mode and a receive mode is reduced to less than 50 microseconds, which corresponds to on or about a minimum range of less than 2 inches. The diode-resistor network, however, has a disadvantage in that the receiver portion of the network causes a loss of signal strength.

In one approach, T-R circuits provided by Matec Instruments delivered a transducer voltage transfer coupling ratio of 23.8% which is considerably lower than legacy T-R switch illustrated in FIG. 1. In another approach, T-R circuits provided by Western Marine Electronics delivered a coupling ratio of 14.9% which is lower than both the Matec design and the legacy T-R switch design as in FIG. 1. Western Marine's circuit architecture uses a capacitive voltage divider (330 pF in lieu of R1 and 1803 pF in lieu of R2) but accomplishes a similar result. At 357 kHz, the transducer's impedance is 247 ohms so that the coupling ratio is approximately (Vi*(247/(247+1351+246)))=Vi*0.134 (actual result may be closer to 0.149 when phase relationships are computed).

Therefore, it can be concluded that the above approaches thus couple about 14.9% to 23.8% of a received signal to the receiver amplifier. For a given low-noise receiver amplifier, this coupling loss decreases the signal-to-noise ratio by about 12.5 to 16.5 dB. If enough power were applied to the transducer, these losses would yield acceptable overall performance. However, the transfer ratios show that a significant amount of received signal has been lost. Once the low-level signals fall below the receiver amplifier's noise floor, the chances of recovering the signal is small.

Thus, there is a need to achieve fast T-R switching times while ensuring that the received signal strength is not lost.

SUMMARY OF THE INVENTION

Accordingly, the present invention relates to an apparatus for achieving fast T-R switching times while ensuring that the signal strength of a received signal is not lost. A differential amplifier having a coupling resistor as an input is used so that the entire input signal is sensed by an operational amplifier, thus decreasing signal losses. Also, by increasing the value of the differential amplifier input resistors (R1–R3), signal loss is further minimized.

Thus, the present invention provides a novel transmit-receive (T-R) switch with fast T-R switching times and low signal loss overcoming the problems faced by prior approaches. While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent methods and apparatus.

In one aspect, a transmit-receive (T-R) switching device for improving time-delay between relay switching times, the switching device comprising a differential receiver for achieving common mode rejection of undesired signals; and a coupling resistor for coupling a transducer to the differential receiver such that substantially all of an input signal is sensed by said receiver to reduce signal losses. The switching device further comprises a diode-resistor network for achieving fast transmit-receive switching times. Steering diodes and resistors are preferably used to protect the receiver from high voltage transmit pulses. The time-delay between a transmit mode and a receive mode is preferably less than 50 microseconds. The received signal strength is preferably reduced by the switching device to less than 1 dB. The differential receiver further comprises a differential amplifier; and wherein signal loss of the switching device is minimized by increasing resistance of the differential amplifier. The T-R switching device improves common mode interference rejection in a receive mode. The switching device is preferably used in sonar systems. For a given received signal, transmit signal is reduced to avoid risk of detection of sonar systems using the T-R switching device.

In another aspect, a method for improving time-delay between relay switching times of a transmit-receive (T-R) switch, the method comprising the steps of using a differential receiver for achieving common mode rejection of undesired signals; and coupling a transducer to the differential receiver using a coupling resistor such that substantially all of an input signal is sensed by said receiver to reduce signal losses. The method further comprising achieving fast transmit-receive switching times using a diode-resistor network, and providing steering diodes and resistors to protect said differential receiver from high voltage transmit pulses. The method also includes providing a differential amplifier; and minimizing signal loss of said switching device increasing the resistance of said differential amplifier.

In yet another aspect, a method for improving time-delay between relay switching times of a transmit-receive (T-R) switch, the method comprising: receiving and converting high-power alternating-current (AC) signals into high-level acoustic signals in a transmit mode; receiving and converting low-level acoustic signals into low-power electrical currents in a receive mode; steering low-power electrical currents to a differential receiver for sensing the low-power electrical currents; and coupling a transducer to the differential receiver using a coupling resistor such that substantially all of said low-power electrical currents are sensed by said receiver to reduce signal losses.

In another aspect, a method for improving time-delay between relay switching times of a transmit-receive (T-R)

switch, the method comprising using a receiver having a differential amplifier for achieving common mode rejection of undesired signals; coupling a transducer to the differential receiver using a coupling resistor such that substantially all of an input signal is sensed by said receiver to reduce signal losses; and whereby transducer voltage transfer coupling ratio is provided by $$Vi*(R1+R2+R3)/(Xi+R1+R2+R3)$$

where Vi=transducer's received input voltage

Xi=internal impedance of transducer

R1, R2=resistance of one leg of differential amplifier

R3=resistance of a second leg of differential amplifier

In a further aspect, a transmit-receive (T-R) switching device for improving coupled signals from a sonar transducer to a pre-amplifier, the device comprising a coupling resistor for limiting signals to the pre-amplifier during a transmit mode; the coupling resistor passing low-level signals to the pre-amplifier during a receive mode; and a differential amplifier using the coupling resistor such that substantially all of an input signal is sensed by the receiver to reduce signal losses.

In yet another aspect, an apparatus for improving time-delay between relay switching times of a transmit-receive (T-R) switch, comprising: means for receiving and converting high-power alternating-current (AC) signals into high-level acoustic signals in a transmit mode means for receiving and converting low-level acoustic signals into low-power electrical currents in a receive mode; means for steering low-power electrical currents to a differential receiver for sensing the low-power electrical currents; and means for coupling a transducer to the differential receiver using a coupling resistor such that substantially all of said low-power electrical currents are sensed by said receiver to reduce signal losses.

In a further aspect, an apparatus for switching signals between a transducer and a receiver in sonar systems, the apparatus comprising: a differential receiver for achieving common mode rejection of undesired signals, said receiver including a differential amplifier; a coupling resistor for coupling the transducer to the differential receiver such that substantially all of an input signal is sensed by said receiver to reduce signal losses; and whereby transducer voltage transfer coupling ratio is provided by $$Vi*(R1+R2+R3)/(Xi+R1+R2+R3)$$

where Vi=transducer's received input voltage

Xi=internal impedance of transducer

R1, R2=resistance of one leg of differential amplifier

R3=resistance of a second leg of differential amplifier

In another further aspect, as shown in the exemplary inverting amplifier design of FIG. 3, a method for improving time-delay between relay switching times of a transmit-receive (T-R) switch, the method comprising: receiving and converting high-power alternating-current (AC) signals into high-level acoustic signals in a transmit mode receiving and converting high-level acoustic signals into low-power electrical currents in a receive mode; steering low-power electrical currents to an inverting receiver amplifier for sensing the low-power electrical currents; and whereby transducer voltage coupling ratio is unity as the transducer's internal impedance forms an integral part of the inverting amplifier's gain-setting network.

DETAILED DESCRIPTION OF EXEMPLARY EMBODIMENTS

Figure 1:
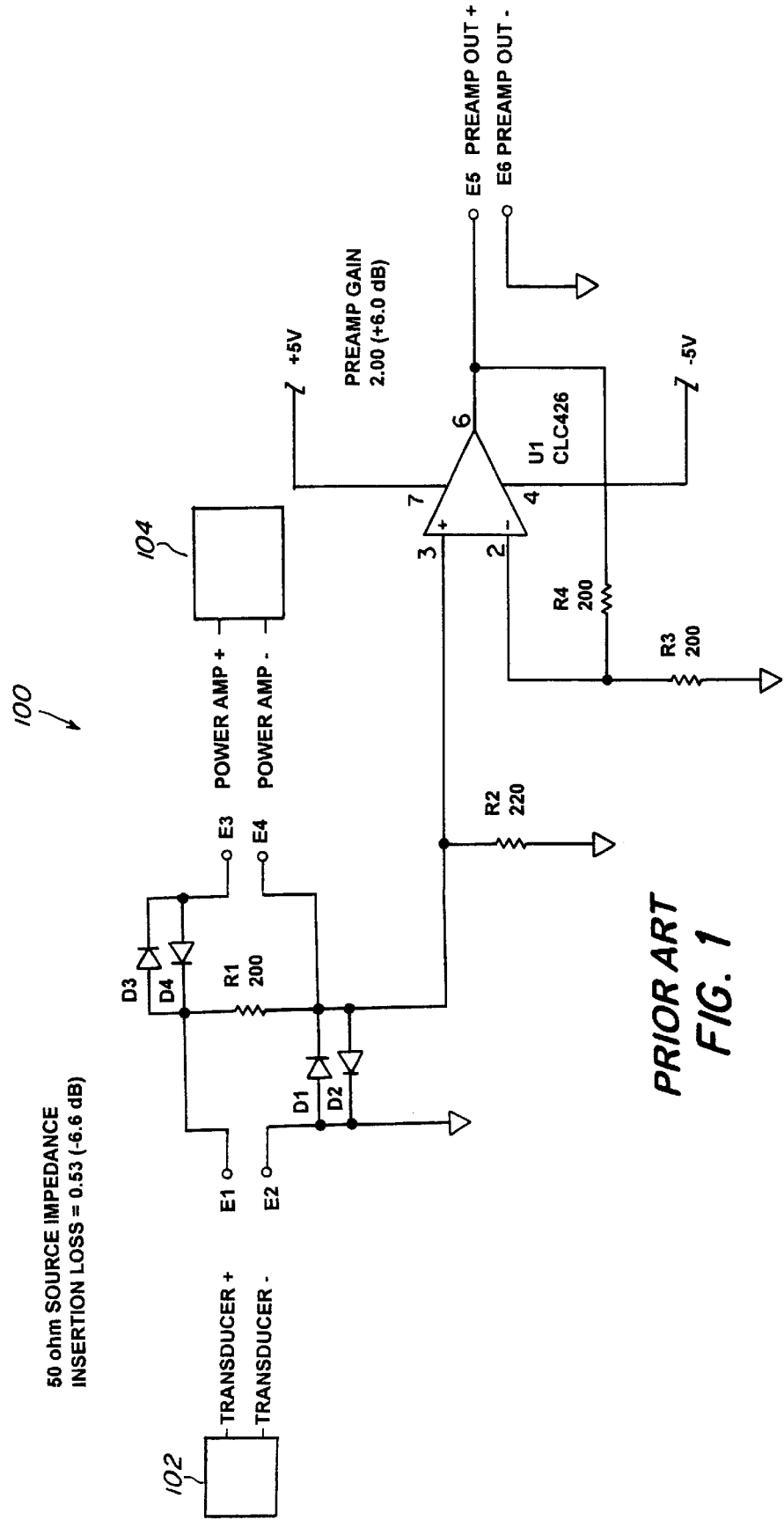
FIG. 1 illustrates a legacy T-R switch schematic.

FIG. 1 shows a schematic diagram of a legacy transmit-receive (T-R) switch 100 where back-to-back diodes D1, D2, D3, D4 are connected across the receiver's input to protect sensitive electronics during the transmit cycle by limiting voltage into the pre-amplifier to about 2 volts peak-to-peak, i.e., in the transmit mode, high-power alternating current (AC) from a power amplifier flows into terminals E3 and E4, through diodes D1–D4, and out of terminals E1 and E2. The AC current passes through a length of cable and is applied to the transducer 102. The transducer 102 converts the high-power signals into high-level acoustic signals which are transmitted into an acoustic medium. Diodes D1–D4 conduct heavily during transmit cycles and cause negligible loss of the transmitted power. Also, diodes D1 and D2 limit the voltage applied to the input of the receiver amplifier U1 to prevent U1 from burning out. Resistor R1 places a load on the power amplifier 104. Thus, there is a trade-off between using high ohmic values for reducing the load versus using low ohmic values for reducing the noise.

Still referring to FIG. 1, in the receive mode, low-level acoustic signals (echoes) are received from the acoustic medium and converted into low-power electrical currents by the transducer. These echo currents pass through the cable and flow into terminals E1 and E2. Diodes D1–D4 offer very high impedances to these low-level signals so the echo currents are "steered" through resistor R1 and into the receiver amplifier U1. Resistor R2 completes the current path. The internal impedance (Xi) of the transducer is in series with resistors R1 and R2. The receiver amplifier U1 amplifies the voltage it senses across resistor R2. This voltage is the transducer's 102 received signal voltage times R2/(Xi+R1+R2). For example, for a transducer with 50 ohms of internal impedance, and R1=200 ohms, and R2=220 ohms, the voltage transfer ratio is Vi * (220/(50+200+220))= Vi * 0.468. That is, 46.8% of the transducer's signal voltage is amplified by the receiver amplifier U1. The rest may be considered lost.

Figure 2:
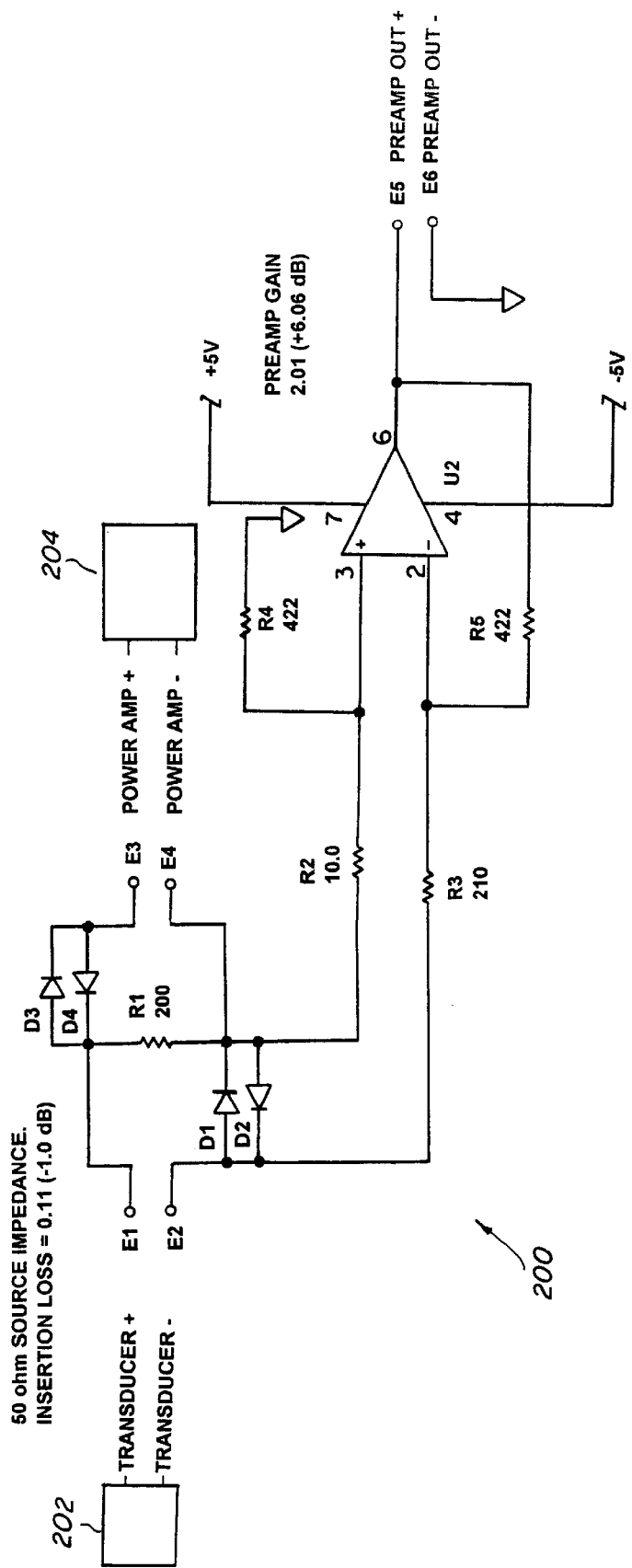
FIG. 2 illustrates a T-R switch schematic in accordance with an exemplary embodiment of the present invention.

Referring to FIG. 2, there is shown a T-R switch schematic 200 in accordance with an exemplary embodiment of the present invention. The T-R switch 200 includes a differential receiver circuit to achieve common mode rejection of undesired signals picked up from the environment. In the transmit mode, high-power alternating current (AC) from the power amplifier 204 flows into terminals E3 and E4, through diodes D1–D4, and out of terminals E1 and E2 to transducer 202. The AC current passes through a length of cable and is applied to the transducer 202 which converts the high-power signals into high-level acoustic signals for transmission into an acoustic medium. Diodes D1–D4 conduct heavily during transmit cycles and cause very little loss of the transmitted power. Also, diodes D1 and D2 limit the voltage applied to the input of the receiver amplifier U2 to prevent it from burning out. Resistor R1 places a load on the power amplifier 204 so that there is a trade-off between using high ohmic values for reducing the load versus low ohmic values for reducing the noise floor.

In the receive mode, still referring to FIG. 2, low-level acoustic signals (echoes) are received from the acoustic medium and converted into low-power electrical currents by the transducer 202. These echo currents pass through the cable and flow into terminals E1 and E2. Diodes D1–D4 offer very high impedances to these low-level signals so that the echo currents are "steered" through resistor R1 and into the receiver amplifier U2. Resistors R2–R5 complete the current path. Receiver amplifier U2 establishes a virtual connection between pins 2 and 3 so that resistors R2 and R3 appear to be connected in series, and thus resistors R4 and R5 appear to have no effect on the received signals. Therefore, resistors R1 and R2 form one leg of the differential amplifier and resistor R3 forms the other leg. The differential amplifier amplifies the voltage it senses across terminals E1 and E2. R1 is employed as a gain member of the receiver amplifier U2 so that its effect on signal loss is nearly eliminated. In the receive mode, the internal impedance (Xi) of the transducer 202 is in series with resistors R1, R2, and R3. Therefore, the transducer's voltage transfer coupling ratio is Vi * (R1+R2+R3)/(Xi+R1+R2+R3). For example, using 50 ohms for Xi, R1=200 ohms, R2=10 ohms, R3=210 ohms, the coupling ratio is computed as Vi * (200+10+210)/(50+200+10+210)=Vi * 0.894 or −0.97 dB.

Using the exemplary T-R switch schematic as in FIG. 2, the coupling ratio (and thus, the signal-to-noise ratio) has improved to 89.4% which corresponds to coupling ratio improvement of 11.5 dB, 15.6 dB, respectively, over prior approaches.

Figure 3:
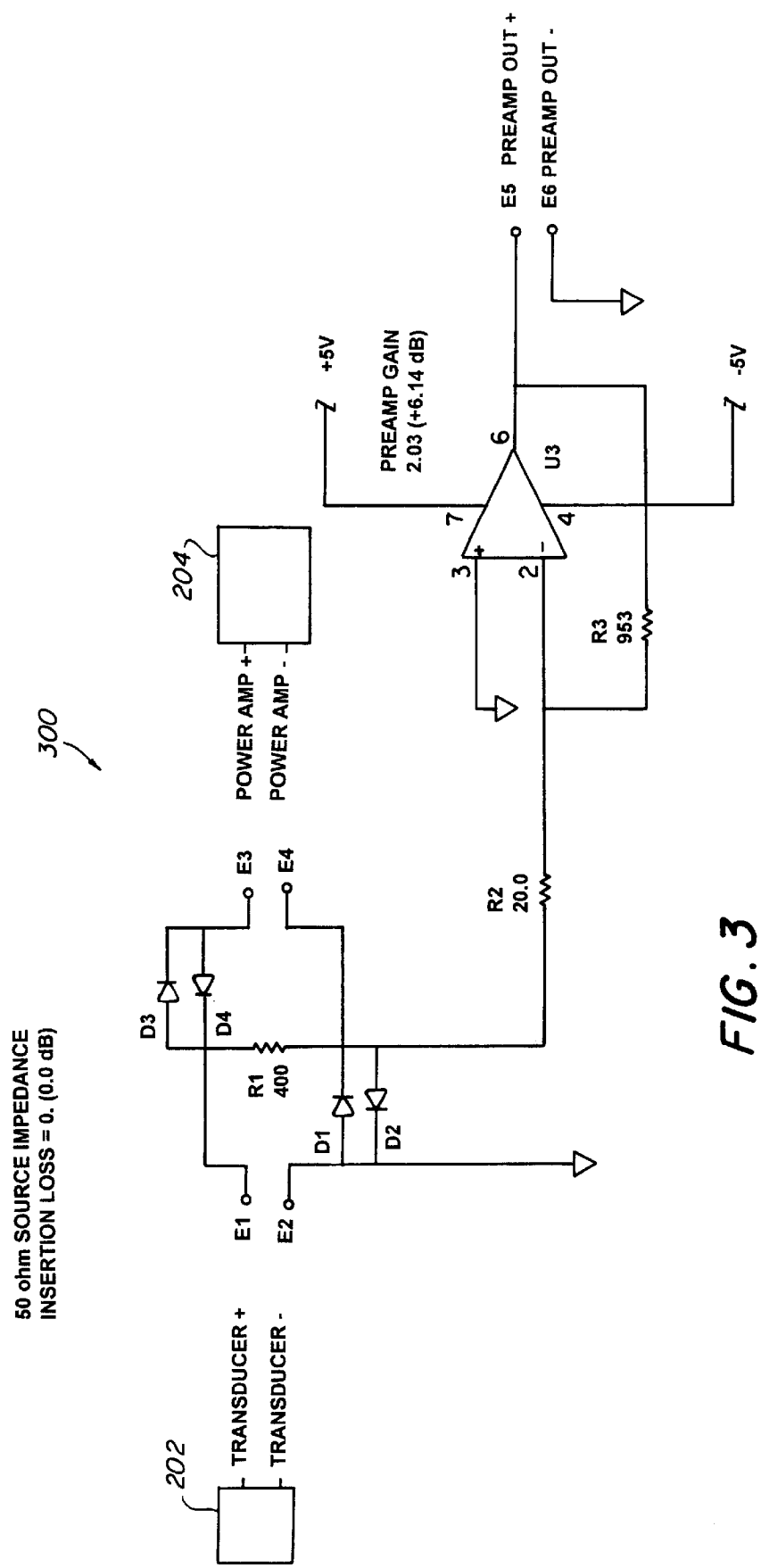
FIG. 3 illustrates an inverting T-R switch schematic in accordance with another exemplary embodiment of the present invention.

FIG. 3 illustrates an inverting T-R switch schematic 300 in another exemplary embodiment of the present invention. T-R switch schematic 300 utilizes an inverting receiver circuit that provides 100% coupling of a signal received by transducer 202. In the transmit mode, high-power alternating current (AC) from power amplifier 204 flows into terminals E3 and E4, through diodes D1–D4, and out of terminals E1 and E2. The AC current passes through a length of cable and is applied to the transducer 202. The transducer 202 converts the high-power signals into high-level acoustic signals which are transmitted into an acoustic medium. Diodes D1–D4 conduct heavily during transmit cycles and cause minimal loss of the transmitted power. Also, diodes D1 and D2 limit the voltage applied to the input of the receiver amplifier U3 to prevent it from burning out. Resistor R1 places a load on the power amplifier 204 so there is a trade-off between using high ohmic values for reducing the load versus low ohmic values for reducing the noise floor.

Still referring to FIG. 3, in the receive mode, low-level acoustic signals (echoes) are received from the acoustic medium and converted into low-power electrical currents by the transducer 202. These echo currents pass through the cable and flow into terminals E1 and E2. Diodes D1–D4 offer very high impedances to these low-level signals so that the echo currents are "steered" through resistor R1 and into the receiver amplifier U3. Resistors R1 and R2 complete the current path. Amplifier U3 establishes a virtual ground between pins 2 and 3, and thus, resistor R2 appears to be grounded. Configured as an inverting amplifier, the voltage gain of the receiver amplifier U3 is set by the ratio of impedance between pins 2 and 6 (R3 in this embodiment), and impedance between pins 2 and 3 (Xi+R1+R2 in this embodiment). Therefore, voltage gain is given by R3/(Xi+R1+R2).

A new low-noise preamplifier takes advantage of the low resistor values inherent in the new inverting T-R design as in FIG. 3. This new "front-end" preamplifier reduced the electronic noise floor from 7.4 nV per root Hz (nV/√Hz) as in FIG. 1 to 2.8 nV/√Hz for the inverting T-R design as in FIG. 3—an improvement of 8.5 dB. In exemplary FIG. 3, R1 is shown to be set at 400 ohms for comparison with T-R switch configuration of FIG. 1. In practice, R1 may be set to a lower resistance with a corresponding decrease in the circuit architecture's self noise. All numeric resistances indicated in FIGS. 2 through 4 are in ohms unless otherwise indicated.

The inverting T-R switch as in FIG. 3 has advanced the state-of-the-art significantly closer to achieving the ideal transmit-receive switch for a single transducer employed in short-range, high-frequency applications. The inverting T-R switch of FIG. 3 contributes to improving signal-to-noise ratios by 21 dB to 25 dB (factor of 11× to 18×) over prior approaches. This performance boost has enabled other circuit improvements to help achieve near-ideal detection of acoustic echo signals. An improvement of 21 dB to 25 dB, achieved using the present invention, also indicates that a given signal-to-noise ratio without resorting to higher power into a medium, such as, for example, water, which would otherwise have required transmitting at 11× to 18× the power level to achieve the same detectable echo signal level.

Bandpass filtering was designed to further reduce the electronic noise in the transducer's operating frequency range. A quality factor (Q) of 5 was selected to provide passbands of 40 kHz for the 200 kHz transducer and 70 kHz for the 350 kHz transducer. This added a further improvement of 10.0 and 8.0 dB respectively over prior approaches.

While specific positions for various components comprising the invention are given above, it should be understood that those are only indicative of the relative positions most likely needed to achieve a desired power with reduced noise margins. It will be appreciated that the indicated positions are exemplary, and several other components may be added or subtracted while not deviating from the spirit and scope of the invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A transmit-receive (T-R) switching device for improving time-delay between relay switching times, the switching device comprising:
    a differential receiver for achieving common mode rejection of undesired signals; and
    a coupling resistor for coupling a transducer, in a current mode, to the differential receiver such that substantially all of an input signal is sensed by said receiver to reduce signal losses, wherein impedance of said transducer is a part of the differential receiver's gain setting impedances on an input side of said differential receiver.

2. The switching device as in claim 1, further comprising:
    a diode-resistor network for achieving transmit-receive switching times of about 50 microseconds.

3. The switching device as in claim 1, further comprising:
    steering diodes and resistors to protect said receiver from voltage transmit pulses at a level that exceeds safe input voltage of the differential receiver.

4. The switching device as in claim 1, wherein said device improves common mode interference rejection in a receive mode.

5. The switching device as in claim 1, wherein transducer voltage transfer loss is reduced to less than 1 dB.

6. The switching device as in claim 1, wherein said differential receiver further comprises:
  a differential amplifier; and wherein
    signal loss of said switching device is minimized by increasing resistance of said differential amplifier.

7. The switching device as in claim 1, wherein said device is used in sonar systems.

8. The switching device as in claim 7, wherein for a given received signal, transmit signal is reduced to avoid risk of detection of said sonar systems.

9. A transmit-receive (T-R) switching device for improving time-delay between relay switching times, the switching device comprising:
  a differential receiver for achieving common mode rejection of undesired signals;
  a coupling resistor for coupling a transducer, in a current mode, to the differential receiver such that substantially all of an input signal is sensed by said receiver to reduce signal losses; and
  said differential receiver including a differential receiver amplifier for receiving echo currents passing through said coupling resistor, wherein said differential receiver amplifier establishes a virtual connection between positive and negative inputs of said receiver amplifier such that resistances connected to said respective positive and negative inputs appear to be in series, wherein time delay between a transmit mode and a receive mode is less than 50 microseconds.

10. A method for improving time-delay between relay switching times of a transmit-receive (T-R) switch, the method comprising the steps of:
  using a differential receiver for achieving common mode rejection of undesired signals; and
  coupling a transducer to the differential receiver using a coupling resistor such that substantially all of an input signal is sensed by said receiver to reduce signal losses.

11. The method as in claim 10, further comprising:
  achieving transmit-receive switching times of less than 50 microseconds using a diode-resistor network.

12. The method as in claim 10, further comprising:
  providing steering diodes and resistors to protect said differential receiver from voltage transmit pulses at a level that exceeds safe input voltage of the differential receiver.

13. A method for improving time-delay between relay switching times of a transmit-receive (T-R) switch, the method comprising:
  using an inverting receiver amplifier circuitry for achieving lossless coupling of a transducer's electrical signals, wherein said coupling being a current-mode coupling;
  receiving and converting alternating-current (AC) signals of a first type into acoustic signals of a first type in a transmit mode;
  receiving and converting acoustic signals of a second type into electrical currents of a second type in a receive mode;
  steering electrical currents of the second type to a receiver amplifier for sensing the electrical currents of the second type; and
  whereby transducer voltage transfer ratio of inverting receiver amplifier is 100%, and wherein impedance of said transducer is a part of the inverting receiver amplifier's gain setting impedances on an input side of said inverting receiver amplifier.

14. The method as in claim 10, wherein transducer voltage transfer ratio loss is reduced to less than 1 dB.

15. The method as in claim 12, further comprising:
  providing a differential amplifier; and
  minimizing signal loss of said switching device increasing the resistance of said differential amplifier.

16. The method as in claim 15, further comprising:
  improving common mode interference rejection in a receive mode.

17. The method as in claim 16, further comprising:
  reducing a transmit signal, for a given received signal, to avoid risk of detection of sonar systems using the T-R switch.

18. A method for improving time-delay between relay switching times of a transmit-receive (T-R) switch, the method comprising:
  receiving and converting alternating-current (AC) signals of a first type into acoustic signals of a first type in a transmit mode;
  receiving and converting acoustic signals of a second type into electrical currents of a second type in a receive mode;
  steering electrical currents of the second type to a differential receiver for sensing the electrical currents of the second type; and
  coupling a transducer to the differential receiver, in a current mode, using a coupling resistor such that substantially all of said electrical currents of the second type are sensed by said receiver to reduce signal losses, wherein impedance of said transducer is a part of the differential receiver's gain setting impedances on an input side of said differential receiver.

19. A method for improving time-delay between relay switching times of a transmit-receive (T-R) switch, the method comprising:
  using a receiver having a differential amplifier for achieving common mode rejection of undesired signals;
  coupling a transducer to the differential receiver, in a current mode, using a resistor such that substantially all of an input signal is sensed by said receiver to reduce signal losses, wherein impedance of said transducer is a part of the differential receiver's gain setting impedances on an input side of said differential receiver; and
  whereby transducer voltage transfer ratio is provided by $$Vi*(R1+R2+R3)/(Xi+R1+R2+R3)$$

where Vi=transducer's received input voltage
  Xi=internal impedance of transducer
  R1, R2=resistance of one leg of differential amplifier
  R3=resistance of a second leg of differential amplifier.

20. A transmit-receive (T-R) switching device for improving coupled signals, in a current mode, from a sonar transducer to a pre-amplifier, the device comprising:
  a resistor for limiting signals to the pre-amplifier during a transmit mode;
  said resistor passing signals to the pre-amplifier during a receive mode; and
  a differential amplifier using said resistor such that substantially all of an input signal is sensed by said receiver to reduce signal losses, wherein impedance of said transducer is a part of the differential amplifier's gain setting impedances on an input side of said differential amplifier.

21. An apparatus for improving time-delay between relay switching times of a transmit-receive (T-R) switch, comprising:
- means for receiving and converting alternating-current (AC) signals of a first type into acoustic signals of a first type in a transmit mode;
- means for receiving and converting acoustic signals of a second type into electrical currents of a second type in a receive mode;
- means for steering electrical currents of the second type to a differential receiver for sensing the electrical currents of the second type; and
- means for coupling a transducer, in a current mode, to the differential receiver using a coupling resistor such that substantially all of said electrical currents of the second type are sensed by said receiver to reduce signal losses, wherein impedance of said transducer is a part of the differential receiver's gain setting impedances on an input side of said differential receiver.

22. An apparatus for switching signals between a transducer and a receiver in sonar systems, the apparatus comprising:
- a differential receiver for achieving common mode rejection of undesired signals, said receiver including a differential amplifier;
- a resistor for coupling the transducer, in a current mode, to the differential receiver such that substantially all of an input signal is sensed by said receiver to reduce signal losses, wherein impedance of said transducer is a part of the differential receiver's gain setting impedances on an input side of said differential receiver; and
- whereby transducer voltage transfer ratio is provided by $$Vi*(R1+R2+R3)/(Xi+R1+R2+R3)$$

where Vi=transducer's received input voltage
Xi=internal impedance of transducer
R1, R2=resistance of one leg of differential amplifier
R3=resistance of a second leg of differential amplifier.

\* \* \* \* \*